United States Patent
Kim et al.

(10) Patent No.: US 7,758,995 B2
(45) Date of Patent: Jul. 20, 2010

(54) SERIAL INTERFACE BETWEEN UNIT CELLS

(75) Inventors: Tae-yong Kim, Suwon-si (KR); Zin Park, Suwon-si (KR); Seung-il Kim, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 53 days.

(21) Appl. No.: 12/017,290

(22) Filed: Jan. 21, 2008

(65) Prior Publication Data
US 2008/0182160 A1 Jul. 31, 2008

(30) Foreign Application Priority Data
Jan. 25, 2007 (KR) .................. 10-2007-0007977

(51) Int. Cl.
*H01M 2/12* (2006.01)
(52) U.S. Cl. ................... 429/82; 429/148
(58) Field of Classification Search ............ 429/82, 429/135, 148
See application file for complete search history.

(56) References Cited

U.S. PATENT DOCUMENTS 3,923,549 A * 12/1975 Mabuchi et al. .......... 429/82

2003/0143459 A1 * 7/2003 Kunimoto et al. .......... 429/158
2005/0079408 A1 * 4/2005 Hirano ..................... 429/82

FOREIGN PATENT DOCUMENTS

| JP | 2001-345088 | | 12/2001 |
| JP | 2005-123069 | | 5/2005 |
| KR | 20-1981-0000307 | Y1 | 4/1981 |
| KR | 10-2007-0078715 | A | 8/2007 |
| KR | 10-2008-0003779 | A | 1/2008 |

OTHER PUBLICATIONS

Notice of Allowance from priority No. KR 10-2007-0007977 dated Sep. 9, 2008.

* cited by examiner

*Primary Examiner*—Patrick Ryan
*Assistant Examiner*—Brent Thomas
(74) *Attorney, Agent, or Firm*—Knobbe, Martens, Olson & Bear LLP (57) ABSTRACT

A serial interface interposed between two serially connected unit cells provides mechanical strength to the serial connection and conductive coupling therebetween. The serial interface includes an inter-connector having a first vent hole formed therein configured for conductively coupling an anode outer wall of a first unit cell and a cathode terminal of a second unit cell to each other; and a spacer having a second vent hole formed therein and configured to be disposed between the inter-connector and an anode outer wall of the second unit cell to prevent a short-circuit due to the movement of the inter-connector.

13 Claims, 6 Drawing Sheets

SERIAL INTERFACE BETWEEN UNIT CELLS

CROSS-REFERENCE TO RELATED APPLICATION

This application claims the benefit of Korean Patent Application No. 10-2007-0007977, filed on Jan. 25, 2007, in the Korean Intellectual Property Office, the disclosure of which is incorporated herein by reference.

BACKGROUND

1. Technical Field

This disclosure relates to a serial interface interposed between two serially connected unit cells, thereby forming a connection mechanically and conductively coupling the unit cells.

2. Discussion of Related Art

In general, alkali storage batteries—such as nickel-hydride storage batteries, nickel-cadmium storage batteries, etc., or lithium-based storage batteries such as lithium-ion cells, lithium-polymer cells, etc.—are generally manufactured by interposing separators between cathodes and anodes, then helically winding them; coupling current collectors to the ends of the cathodes and the anodes to form electrodes, disposing the electrodes within metallic outer cases, welding lead portions extending from the current collectors to seals; and mounting the seals on openings of the outer cases while interposing insulating gaskets therebetween. Because such an alkali storage battery requires a high output when used, for example, as a power source for an electric motor or an electric automobile, etc., alkali storage batteries have generally been assembled into a module cells made by connecting a plurality of individual cells in series. Where storage batteries are used in high output applications such as powering a large electric motor or an electric automobile, the module cell comprising a plurality of cylindrical unit cells coupled in serial and/or parallel have been used.

Figure 1:
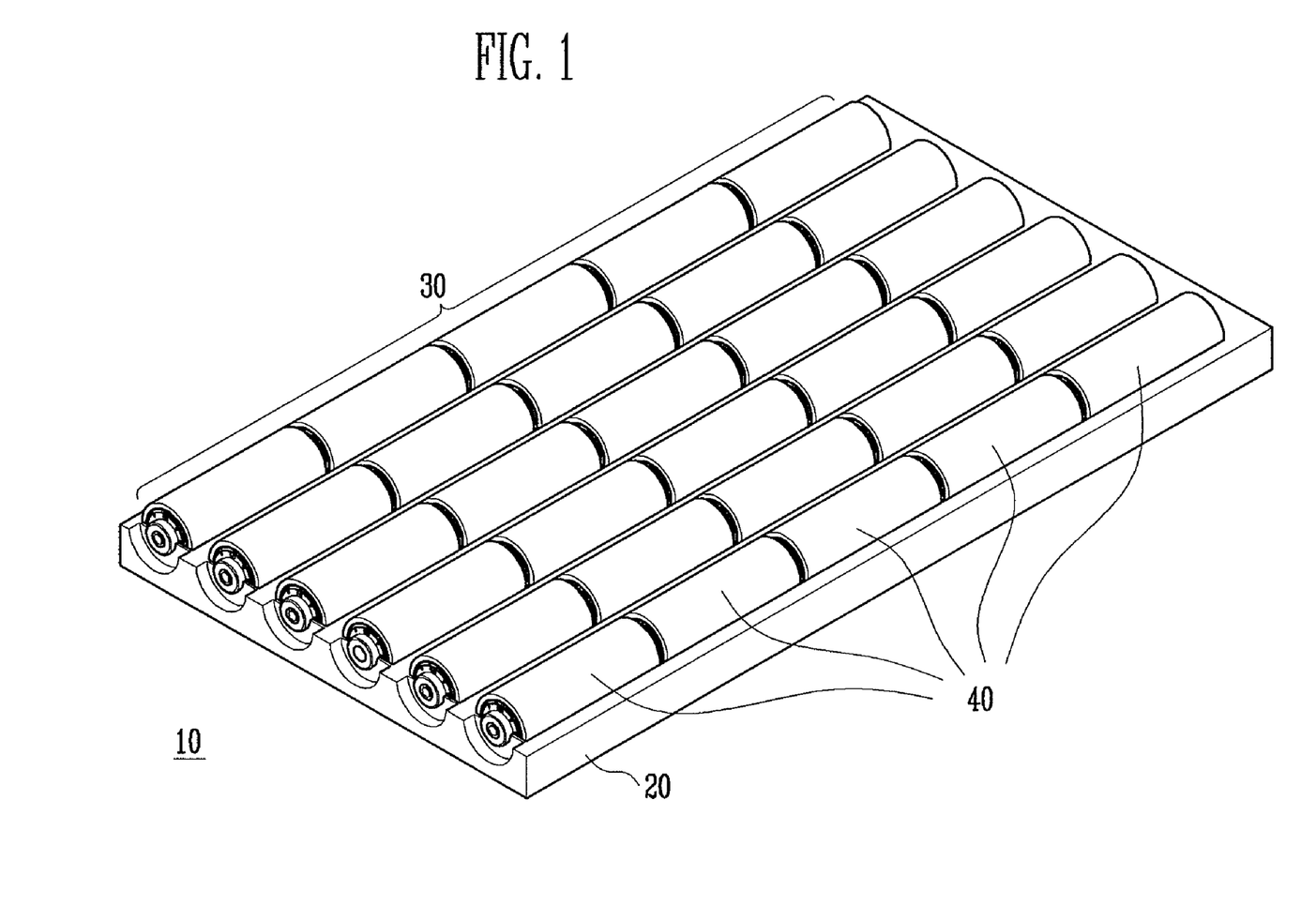
FIG. 1 is a perspective view showing an embodiment of a module cell comprising a plurality of cylindrical unit cells connected in series.

FIG. 1 shows in perspective, a plane-frame module cell 10 comprising a parallel arrangement of cylindrical serial cells 30 in a frame 20, the cylindrical serial cells 30 being formed by serially connecting a predetermined number of cylindrical unit cells 40. Although only a lower frame receiving the cylindrical serial cells 30 is shown in the FIG. 1, there may also be one or more upper frames having a structure similar to that of the lower frame stacked thereon.

In the cylindrical serial cells 30 shown, a serial interface is interposed between the two serial unit cells 40, the serial interface mechanically securing and electrically coupling the two unit cells.

Lithium-ion unit cells do not normally outgas. Internal and/or external conditions can cause physical and/or chemical problems that increase the internal pressure of a cell, however, which can rupture a safety vent of the cell. Consequently, a structure (Degassing structure) for discharging a high pressure gas generated in the cell to the outside environment is required in order to mitigate this pressure.

In nickel-metal-hychoride (Ni-MH) cells, gases are normally generated by internal chemical reactions and discharged out of the cell. This gas is continuously discharged, and does not typically cause a problem if vented to the outside environment. However, where the unit cell is sealed, for example, by a serial interface, gas can accumulate over time adversely affecting the unit cell and/or risking explosion.

Accordingly, there is a need for a serial interface providing sufficient mechanical strength to serially connect two cylindrical unit cells and to conductively connecting the unit cells, as well as to permit discharge of high pressure and waste gases.

SUMMARY OF THE INVENTION

Embodiments disclosed herein solve one or more of the above problems. It is an object to provide a serial interface and a serial cell comprising the same that can be manufactured at a low cost and that efficiently discharges high pressure gas and/or waste gas generated by unit cells.

It is another object to provide a serial interface and a serial cell comprising the same having a structure for efficiently discharging high pressure gas and/or waste gas generated in unit cells while facilitating serial connection between the unit cells.

In order to accomplish the above objects, some embodiments provided a serial interface for a cylindrical cell, the serial interface comprising: an inter-connector having a first vent hole formed therein and conductively supporting an first electrode (anode) contacting area of a first unit cell and a second electrode (cathode) contacting area of a second unit cell to each other; and a spacer located between the inter-connector and an first electrode (anode) contacting area of the second unit cell to prevent short-circuit due to the movement of the inter-connector.

Also, in order to accomplish the above objects, some embodiments provide a serial cell comprising: two or more unit cells; and a serial interface connecting a first unit cell and a second unit cell between the lower part of the first unit cell of the two or more unit cells and the upper part of the second unit cell adjacent to the first unit cell. Embodiments of the serial interface comprise an inter-connector having a vent hole formed therein and conductively supporting an anode contacting area of a first unit cell and a cathode contacting area of a second unit cell to each other; and a spacer located between the inter-connector and an anode contacting area of the second unit cell to prevent short-circuit due to the movement of the inter-connector.

Some embodiments provide a serial interface and/or a serial cell comprising the serial interface and plurality of unit cells. Some embodiments of the serial interface comprise: an inter-connector having a first vent hole formed therein, and dimensioned and configured for conductively coupling a first electrode-contacting-area of a first unit cell and a second electrode contacting area of a second unit cell to each other; and a spacer dimensioned and configured for disposing between the inter-connector and a first electrode-contacting-area of the second unit cell to prevent a short-circuit.

In some embodiments, the first electrode contacting area is an anode outer wall and the second electrode cathode contacting area is a cathode terminal.

In some embodiments, the first vent hole is circular, elliptical, or rectangular. In some embodiments, the spacer further comprises a second vent hole for discharging gas from the first vent hole to the outside environment.

Some embodiments further comprise a position fixing member allowing the first vent hole and the second vent hole to at least partially overlap each other. In some embodiments, the position fixing member further comprises: a fixing groove formed in circumferential area of a contact area between the inter-connector and the spacer; and a fixing projection formed on the spacer, dimensioned and configured to couple with the fixing groove.

In some embodiments, the inter-connector further comprises: a first supporting surface dimensioned configured for contacting and supporting the first electrode-contacting-area of the first unit cell; a second supporting surface dimensioned and configured for contacting and supporting the second electrode-contacting area of the second unit cell; and a step wall disposed between the first supporting surface and the second supporting surface forming a step therebetween.

In some embodiments, the first supporting surface, the second supporting surface, and the step wall are integrally formed.

In some embodiments, the first vent hole perforates the step wall.

In some embodiments, the spacer is dimensioned and configured to insulate the first supporting surface of the inter-connector from the anode outer wall of the second unit cell. In some embodiments, the spacer comprises a protrusion formed on a portion thereof, dimensioned and configured to form a second vent hole when assembled to contact the first supporting surface of the inter-connector.

In some embodiments, the outer wall of the spacer has a circumference larger than a circumference of the unit cells.

In some embodiments, the inter-connector comprises a metal and the spacer comprises a synthetic resin.

Some embodiments of the serial cell further comprise: a first cap assembly disposed on an upper part of a top unit cell; and a second cap assembly disposed on a lower part of a bottom unit cell.

BRIEF DESCRIPTION OF THE DRAWINGS

These and/or other aspects and advantages will become apparent and more readily appreciated from the following description of the preferred embodiments, taken in conjunction with the accompanying drawings of which.

DETAILED DESCRIPTION OF CERTAIN PREFERRED EMBODIMENTS

Hereinafter, a preferred embodiment which a person of ordinary skill in the art can easily carry out is described in more detail with reference to the accompanying drawings. However, one skilled in the are will understand that changes in many different forms are possible and that the disclosure should not be construed as limited to the embodiments set forth herein.

Figure 2A:
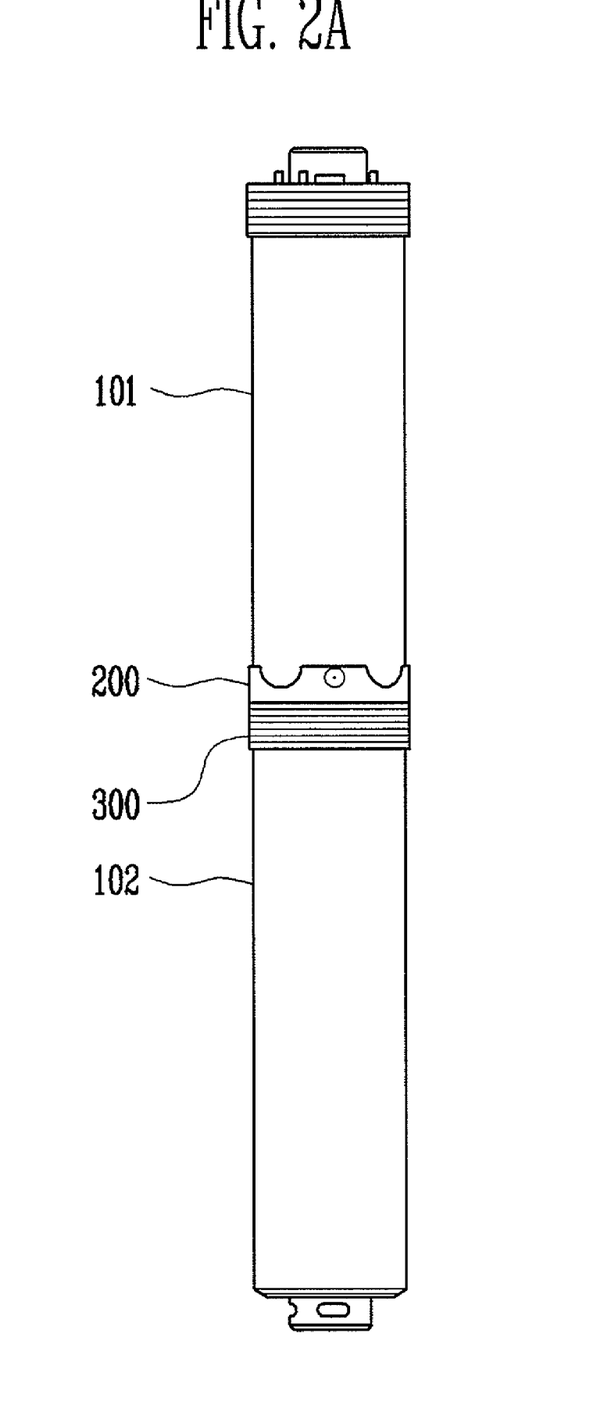
FIG. 2A is a front view of a cylindrical unit cell comprising an embodiment of a serial interface.
Figure 2B:
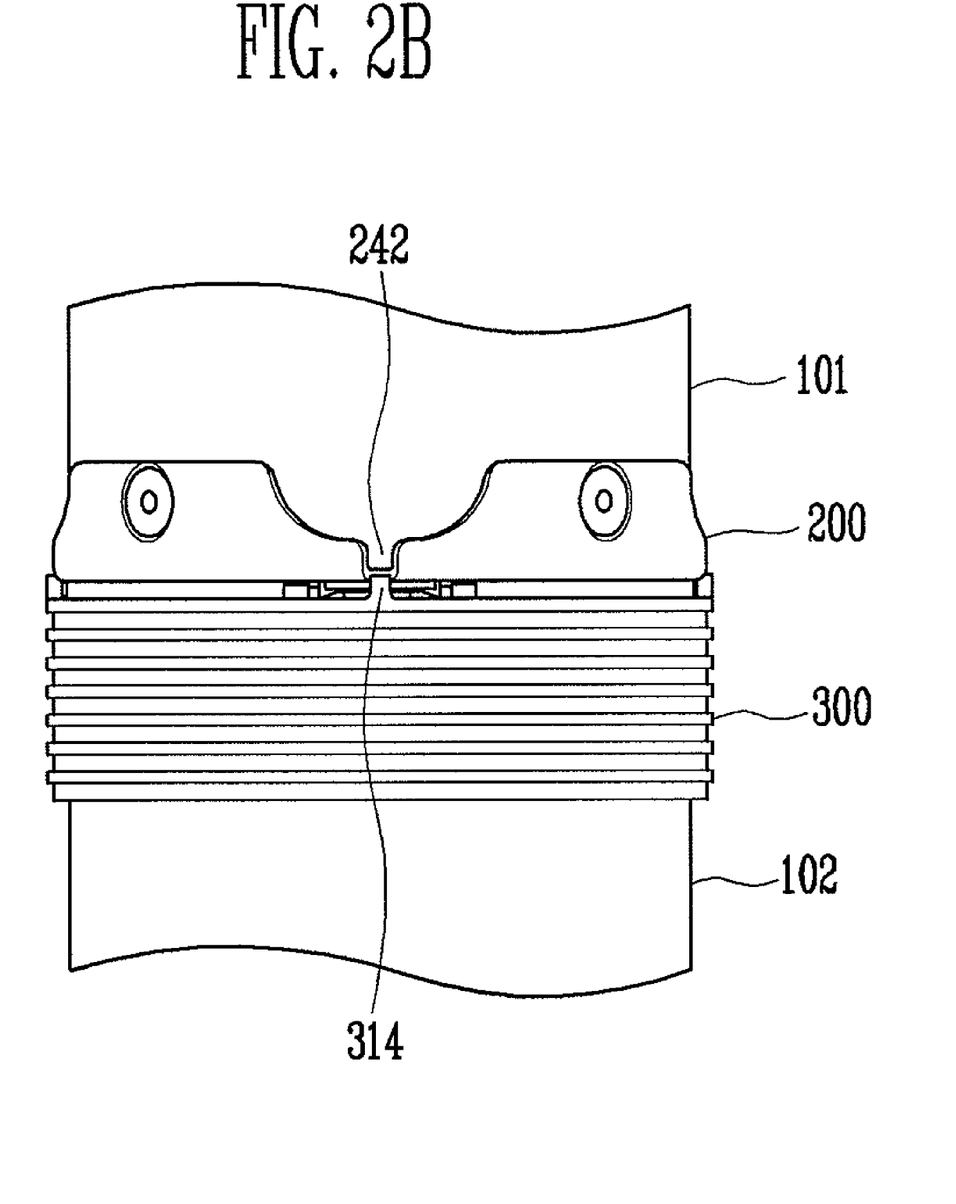
FIG. 2B is detail front view of the serial interface portion from FIG. 2A.

FIG. 2A shows a perspective view of an embodiment of a cylindrical serial interface comprising an embodiment of a serial interface and FIG. 2B shows a detail of the serial interface of FIG. 2A.

The cylindrical serial cell shown in FIGS. 2A and 2B comprises interface components 200 and 300 interposed between two cylindrical unit cells 101 and 102. The serial interface comprises an inter-connector 200 forming an upper part and a spacer 300 forming a lower part.

The inter-connector 200 comprises a first vent hole formed therein, as discussed in greater detail below, and is dimensional and configured for conductively supporting an anode outer wall of a first cylindrical unit cell 101 and a cathode terminal of a second cylindrical unit cell 102 to each other. The spacer 300 comprises a second vent hole formed therein, as discussed in greater detail below, and is dimensioned and configured to be disposed between the inter-connector 200 and an anode outer wall of the second cylindrical unit cell 102 to prevent short-circuit due to the movement of the inter-connector.

In the illustrated embodiment, the outer wall of the spacer 300 has a circumference larger than the circumstances of the cylindrical unit cells 101 and 102, thereby facilitating cooling of the cylindrical unit cells 101 and 102. The outer wall of the spacer 300 forms a space between an inner wall of a module cell frame in which the cylindrical unit cells 101 and 102 are disposed, and an outer wall of the cylindrical unit cells 101 and 102. High pressure gas and/or waste gas generated by the cylindrical unit cells 101 and 102 can also be discharged into this space.

Some embodiments further comprise a first cap assembly coupled to the upper part of a top unit cell and a second cap assembly coupled to the lower part of a bottom unit cell (not illustrated). When the module-type cell comprises a plurality of the serial cells assembled in a case, the first and second cap assemblies can function to a couple the serial cells to the case.

Figure 3A:
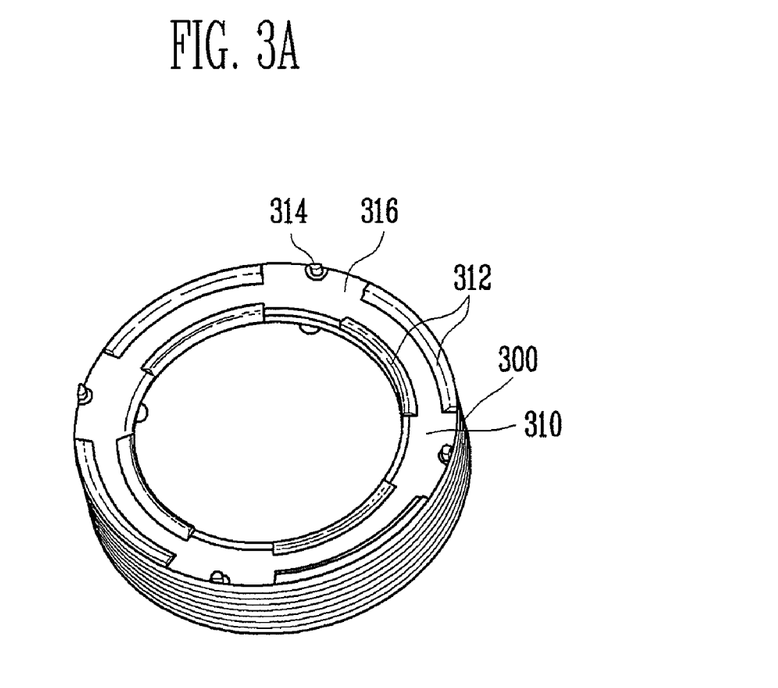
FIG. 3A is a perspective view showing an embodiment useful of a spacer in an embodiment of a serial interface.
Figure 3B:
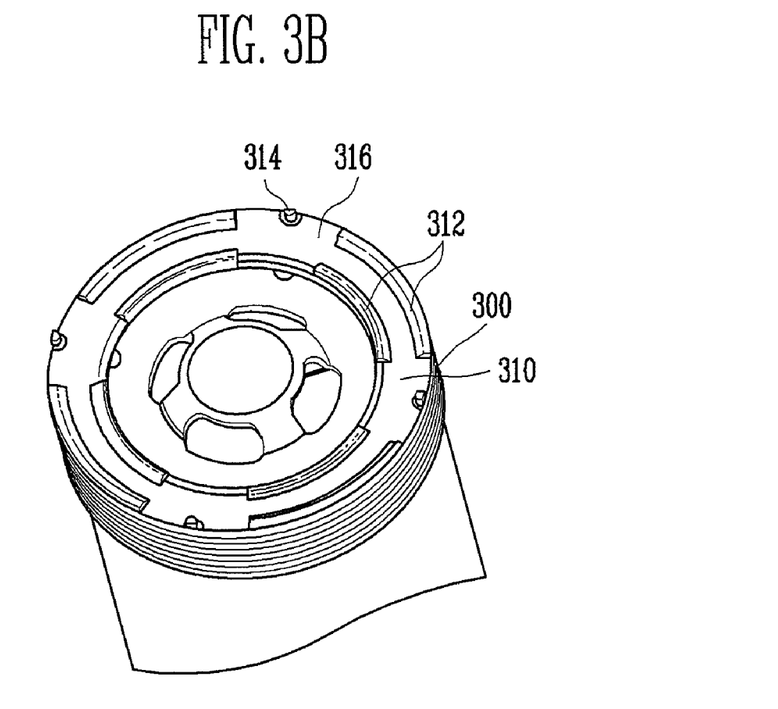
FIG. 3B is a perspective view showing the spacer of FIG. 3A is coupled with a cylindrical unit cell.

FIG. 3A shows in perspective an embodiment of a spacer 300 useful in some embodiments of the serial interface and FIG. 3B shows an embodiment of a spacer 300 coupled with a cylindrical unit cell.

The spacer 300 is dimensioned and configured to insulate a first supporting surface of the inter-connector 200 from the anode outer wall of the second unit cell 102. In the illustrated embodiment, a second vent hole is formed at the portion of the spacer 300 dimensioned and configured for contacting a first supporting surface 220 of the inter-connector 200 as discussed in greater detail below. A ventilation space, in the illustrated embodiment, the second vent hole 316, is formed by assembling the spacer 300 and the inter-connector 200. When the spacer 300 and the inter-connector 200 are assembled, the second vent hole is formed at the portion of the spacer 300 by a protrusion 312 on the spacer 300. Preferably the second vent hole at least partially overlaps the first vent hole in a radial direction, which increases the discharge efficiency of gas as would be apparent to one skilled in the art.

Figure 4A:
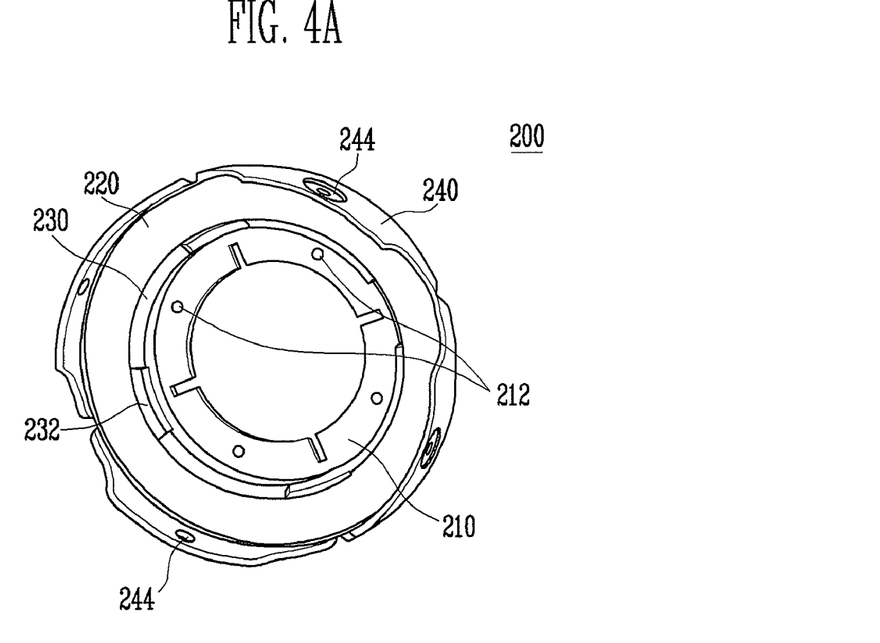
FIG. 4A is a perspective view showing an embodiment of an inter-connector useful in a serial interface.
Figure 4B:
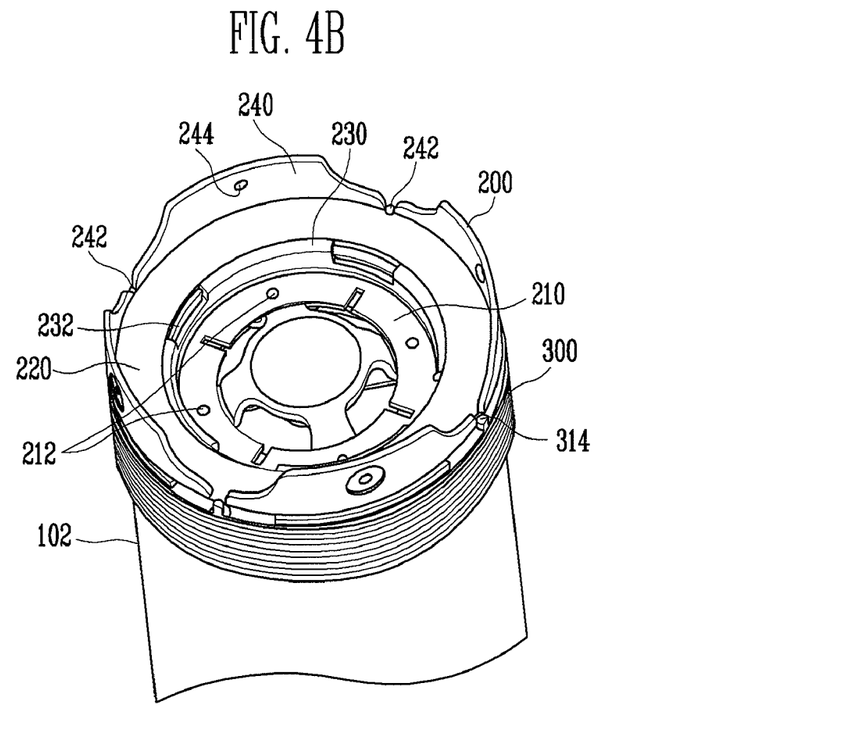
FIG. 4B is a perspective view showing the inter-connector of the FIG. 4A coupled with cylindrical unit cell and a spacer.

FIG. 4A shows in perspective an embodiment of an inter-connector 200 useful in an embodiment of a serial interface. FIG. 4B shows in perspective an embodiment of a spacer 300 coupled to the upper part of a cylindrical unit cell, and an embodiment of an inter-connector 200 coupled to the spacer 300.

The inter-connector 200 shown comprises a first supporting surface 220 dimensioned and configured for contacting and supporting the anode of the first cylindrical unit cell; a second supporting surface 210 dimensioned and configured for contacting and supporting the cathode of the second cylindrical unit cell 102; and a step wall 230 disposed between the first supporting surface 220 and the second supporting surface 210, providing a step therebetween.

In the illustrated embodiment, the first supporting surface 220, the second supporting surface 210, and the step wall 230 are integrally formed. A first vent hole 232 for discharging high pressure gas and/or waste gas generated by the second cylindrical unit cell 102 is formed in the step wall 230. The first vent hole 232 forms perforation in the step wall 230, configured to improve the discharge efficiency of gas while minimizing the weakness of the step wall 230. The first vent hole 232 has any suitable shape, for example, circular, elliptical, or rectangular.

The illustrated inter-connector 200 comprises a fixing wall 240 coupled to the first supporting surface 220, which is dimensioned and configured to receive the first cylindrical unit cell 101 therein when connecting a first cylindrical unit cell 101 and a second cylindrical unit cell 102 in series. The illustrated embodiment also comprises, a first welding component 244 on the fixing wall 240 for resistance welding the inter-connection 200 to an outer wall of a first cylindrical unit cell 101. A second welding component 212 is provided on the second supporting surface 210 for welding to a cathode terminal of a second cylindrical unit cell 102.

Figure 5:
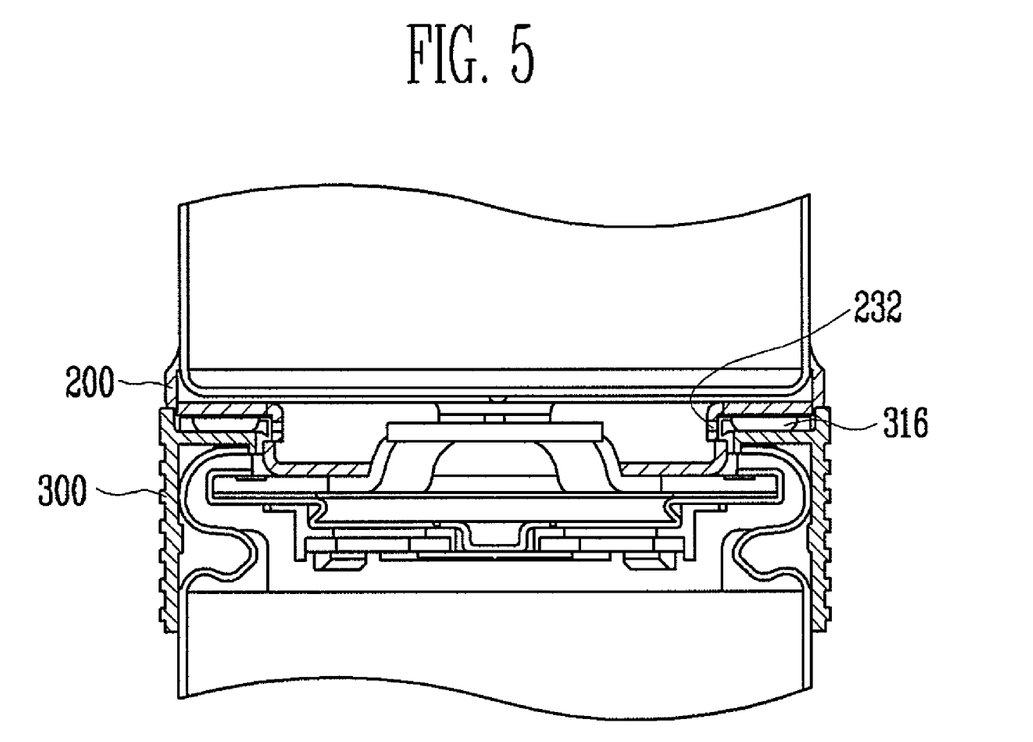
FIG. 5 is a cross-sectional view showing the spacer of FIG. 3A and the inter-connector of FIG. 4A coupled to form an embodiment of a serial interface.

FIG. 5 is a cross-sectional view showing two unit cells coupled in series by interposing the inter-connector 200 of FIG. 4A and the spacer 300 of FIG. 3A.

Preferably, the inter-connector 200 comprises one or more suitable metals because the inter-connector 200 conductively couples the cathode of first cylindrical unit cell 101 and the anode of a second cylindrical unit cell 102, as well as mechanically supporting the two unit cells. In the other hand, the spacer 300 preferably comprises one or more suitable insulating materials, for example, synthetic resins which are relatively inexpensive. Embodiments of the spacer 300 are not subject to excessive mechanical stress.

In order to discharge high pressure gas and/or waste gas generated by the second cylindrical unit cell 102, some embodiments of the serial interface comprise a position fixing member or means that align the first vent hole 232 and the second vent hole to at least partially overlap each other. In some embodiments, the position fixing member or means permits alignment of the first vent hole 232 and the second vent hole does not require relative rotation between the inter-connector 200 and the spacer 300.

In the embodiments illustrated in FIGS. 2B, 3A, 3B, 4A, and 4B, the position fixing member comprises a fixing groove 242 and a fixing projection 314. The fixing groove 242 is formed on the inter-connector 200 in the circumferential area of the contact area between the inter-connector 200 and the spacer 300. The fixing projection 314 is formed on the spacer 300 and is dimensioned and configured to cooperatively couple with the fixing groove 242.

In the assembled serial interface illustrated in FIG. 5, high pressure gas and/or waste gas generated in the cathode of the second cylindrical unit cell 102 are efficiently discharged through the radially aligned first vent hole 232 of the inter-connector 200 and the second vent hole 316 formed by the spacer 300 and inter-connector 200.

Typical lithium-ion unit cells comprise a safety vent which opens when the internal pressure of the cell increases to a selected pressure, for example, when conditions inside and/or outside the cell cause physical and/or chemical problems within the cell that generate gas. The safety vent thus prevents explosion of the cell. In the embodiment illustrated in FIG. 5, the first vent hole 232 and second vent hole 316 together form a gas discharge structure, channel, and/or dedicated degassing duct, that releases gas pressure if the safety vent ruptures.

Consequently, in some embodiments, high pressure gas and/or waste gas generated in the unit cells is efficiently discharged in a system that can be inexpensively manufactured. In some embodiments, high pressure gas and/or waste gas generated in the unit cells is efficiently discharged while facilitating serial connecting the unit cells.

Although certain embodiments have been shown and described, it will be appreciated by those skilled in the art that changes can be made without departing from the principles and spirit of the disclosure, the scope of which is defined in the appended claims and their equivalents.

What is claimed is:

1. A serial interface, comprising:
   an inter-connector having a first vent hole formed therein, the inter-connector conductively coupling a first electrode-contacting-area of a first unit cell and a second electrode-contacting-area of a second unit cell;
   a spacer disposed between the inter-connector and a first electrode-contacting-area of the second unit cell so as to prevent a short-circuit, wherein the spacer comprises a second vent hole; and
   a position fixing member comprising a fixing groove, wherein the position fixing member is positioned between the inter-connector and the spacer so that the first vent hole and the second vent hole at least partially overlap each other such that gas discharged from the first vent hole passes through the second vent hole to the outside environment.

2. The serial interface of claim 1, wherein the first electrode contacting area is an anode outer wall and the second electrode cathode contacting area is a cathode terminal.

3. The serial interface of claim 1, wherein the first vent hole is circular, elliptical, or rectangular.

4. The serial interface of claim 1, wherein the position fixing member comprises:
   a fixing groove formed in circumferential area of a contact area between the inter-connector and the spacer; and
   a fixing projection, formed on the spacer, configured to couple with the fixing groove.

5. The serial interface of claim 1, wherein the inter-connector further comprises:
   a first supporting surface configured for contacting and supporting the first electrode-contacting-area of the first unit cell;
   a second supporting surface configured for contacting and supporting the second electrode-contacting area of the second unit cell; and
   a step wall disposed between the first supporting surface and the second supporting surface forming a step therebetween.

6. The serial interface of claim 5, wherein the first supporting surface, the second supporting surface, and the step wall are integrally formed.

7. The serial interface of claim 5, wherein the first vent hole perforates the step wall.

8. The serial interface of claim 5, wherein the spacer is configured to insulate the first supporting surface of the inter-connector from the anode outer wall of the second unit cell.

9. The serial interface of claim 8, wherein the spacer comprises a protrusion formed on a portion thereof, the protrusion configured to form a second vent hole when assembled to contact the first supporting surface of the inter-connector.

10. The serial interface of claim 1, wherein the outer wall of the spacer has a circumference larger than a circumference of the unit cells.

11. The serial interface of claim 1, wherein the inter-connector comprises a metal and the spacer comprises a synthetic resin.

12. A serial cell, comprising:
    a plurality of unit cells, each of said plurality of unit cells comprising a first unit cell and a second unit cell; and
    a serial interface of any of claim 1-3 or 4-11 disposed between and electronically coupling a lower part of the first unit cell and an upper part of the second unit cell.

13. The serial cell of claim 12 further comprising:
    a first cap assembly disposed on an upper part of the first unit cell; and
    a second cap assembly disposed on a lower part of the second unit cell.

* * * * *